United States Patent [19]

Suzuki

[11] Patent Number: 5,202,842
[45] Date of Patent: Apr. 13, 1993

[54] ROTATIONAL POSITION DETECTING DEVICE WHICH COMPENSATES FOR ECCENTRICITY OF ROTATING OBJECT

[75] Inventor: Masumi Suzuki, Niwa, Japan

[73] Assignee: Kabushiki Kaisha Okuma Tekkosho, Aichi, Japan

[21] Appl. No.: 913,992

[22] Filed: Jul. 17, 1992

Related U.S. Application Data

[63] Continuation of Ser. No. 610,109, Nov. 7, 1990, abandoned.

[30] Foreign Application Priority Data

Nov. 29, 1989 [JP] Japan ................................. 1-310235

[51] Int. Cl.$^5$ .......................................... G06F 15/20
[52] U.S. Cl. .................................. 364/571.01; 377/17
[58] Field of Search ............................... 381/594, 603; 364/571.01, 571.04, 571.05; 377/17

[56] References Cited

U.S. PATENT DOCUMENTS

| 3,553,469 | 1/1971 | Stutz et al. | 359/618 |
| 4,642,902 | 2/1987 | Niedermayr | 364/560 X |
| 4,698,828 | 10/1987 | Hiramoto | 377/17 X |
| 4,922,175 | 5/1990 | Sugiura et al. | 318/594 X |
| 5,117,376 | 5/1992 | Rieder et al. | 364/571.04 |

Primary Examiner—Edward R. Cosimano
Attorney, Agent, or Firm—Wenderoth, Lind & Ponack

[57] ABSTRACT

A rotational position detecting apparatus detects the rotational position of a rotating object and compensates for an eccentricity of the rotating object. First and second sensors generate first and second detection signals having phases offset relative to each other. An error signal denoting the eccentricity of the rotating object is generated in accordance with a fluctuation of an amplitude signal corresponding to a difference between amplitudes of the first and second detection signals. The error signal is added to a position signal to obtain a eccentricity compensated rotational position detection signal.

4 Claims, 4 Drawing Sheets

5,202,842

ROTATIONAL POSITION DETECTING DEVICE WHICH COMPENSATES FOR ECCENTRICITY OF ROTATING OBJECT

This application is a continuation of now abandoned application, Ser. No. 07/610,109, filed Nov. 7, 1990.

BACKGROUND OF THE INVENTION

The present invention relates to an apparatus for detecting a rotational position, and more particularly, to an apparatus for detecting the position of rotation of an object by correcting errors caused by eccentricity of the object.

More particularly, the present invention relates to an apparatus for detecting a rotational position, and more particularly to an apparatus which detects the rotational position of a rotating object such as a spindle and a motor shaft in a motor which actuates the spindle or feed shafts in a machine tool and in a controller therefor.

In this controller, a feed back control is generally used so that a rotational position information on the spindle and the motor shaft is fed back to the controller. Therefore, the machining accuracy of the machine tool depends on the accuracy of the position detecting apparatus. In this connection, there is a requirement of a high accuracy positional detection.

FIG. 1 shows the structure of prior art gear-type magnetic detecting apparatus for detecting a rotational position. In the figure, two-phase AC signals V sin $\theta$ and V cos $\theta$ having phase difference of 90° from each other are generated from a two-phase AC signal generating device 20, which includes a gear 1, a permanent magnet 2 and magnetic sensors 3 and 4. A signal generating device 13 includes sample-and-hold (S/H) circuits 11a and 11b and analog/digital (A/D) converters 12a and 12b, and extracts from the two-phase AC signals two-phase instantaneous signals and outputs the same. A higher-order signal generating device 14 includes comparators, a pulse counter, etc., has input thereto the two-phase AC signals, and counts the number of waves of the two-phase AC signals. A positional signal generating device 17 includes a microcomputer and the like and executes an operation, $\theta = \tan^{-1}(V \sin \theta / V \cos \theta)$ based on the two-phase instantaneous signals and adds the number of waves from the higher-order signal generating device 14 to detect a position $\alpha$ within one rotation of the gear 1.

In the prior art detecting apparatus for detecting the rotational position as mentioned above, however, it is difficult to precisely align the center of the gear with that of the rotary shaft. In practice, so-called eccentricity, or displacement of the center of the gear from the center of the rotary shaft, is found to occur, and this eccentricity causes of microdisplacement in the direction of the gear rotation corresponding to the rotational angle. The operation mentioned above is not therefore sufficient to determine the precise position of rotation.

SUMMARY OF THE INVENTION

The present invention has been contrived in view of the foregoing, and aims at providing an apparatus for detecting the accurate position of rotation.

According to one aspect of the present invention, for achieving the objects described above, there is provided a detecting apparatus for detecting the rotational position of an object which includes a device for generating two-phase AC signals which have a periodic waveform each corresponding to a distance covered by a rotary moving object and which have a given phase difference from each other, a device for generating higher order signals which counts the number of waves of the two-phase AC signals and assigns the value as the higher order of the positional information on the rotary moving object, a device for generating two-phase instantaneous signals by detecting the instantaneous values of said two-phase AC signals, a device for generating amplitude signals that correspond to the amplitude of the two-phase AC signals based on the two-phase instantaneous signals, a device for generating an eccentricity error signal that corresponds to the amplitude signal based on the relation between a fluctuation in the amplitude signal within one rotation of the rotary moving object with the eccentricity error which is the displacement error of the rotary moving object in the direction of rotation, and a device for generating a positional signal which indicates the position of the rotary moving object whithin one rotation by calculating the position within one cycle based on the ratio between the two-phase instantaneous values outputted from the device for generating two-phase instantaneous signal, adding the signal obtained by the calculation to the eccentricity error signal, and further adding the higher-order information.

DESCRIPTION OF THE PREFERRED EMBODIMENT

An embodiment of the present invention will now be described referring to the attached drawings.

Figure 1:
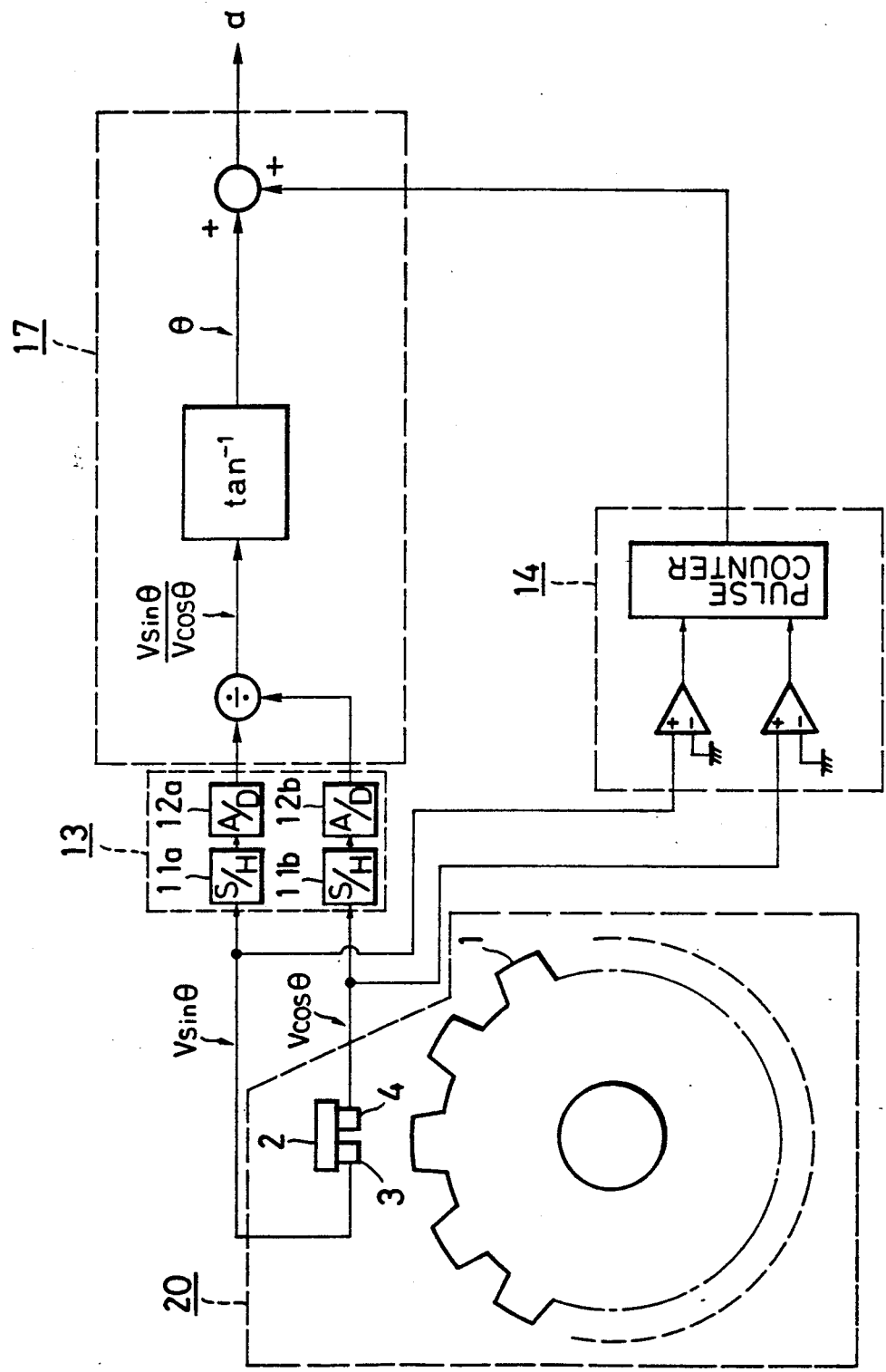
FIG. 1 shows the structure of a gear type magnetic detecting apparatus for detecting the rotational position according to the prior art.
Figures 2A, 2B:
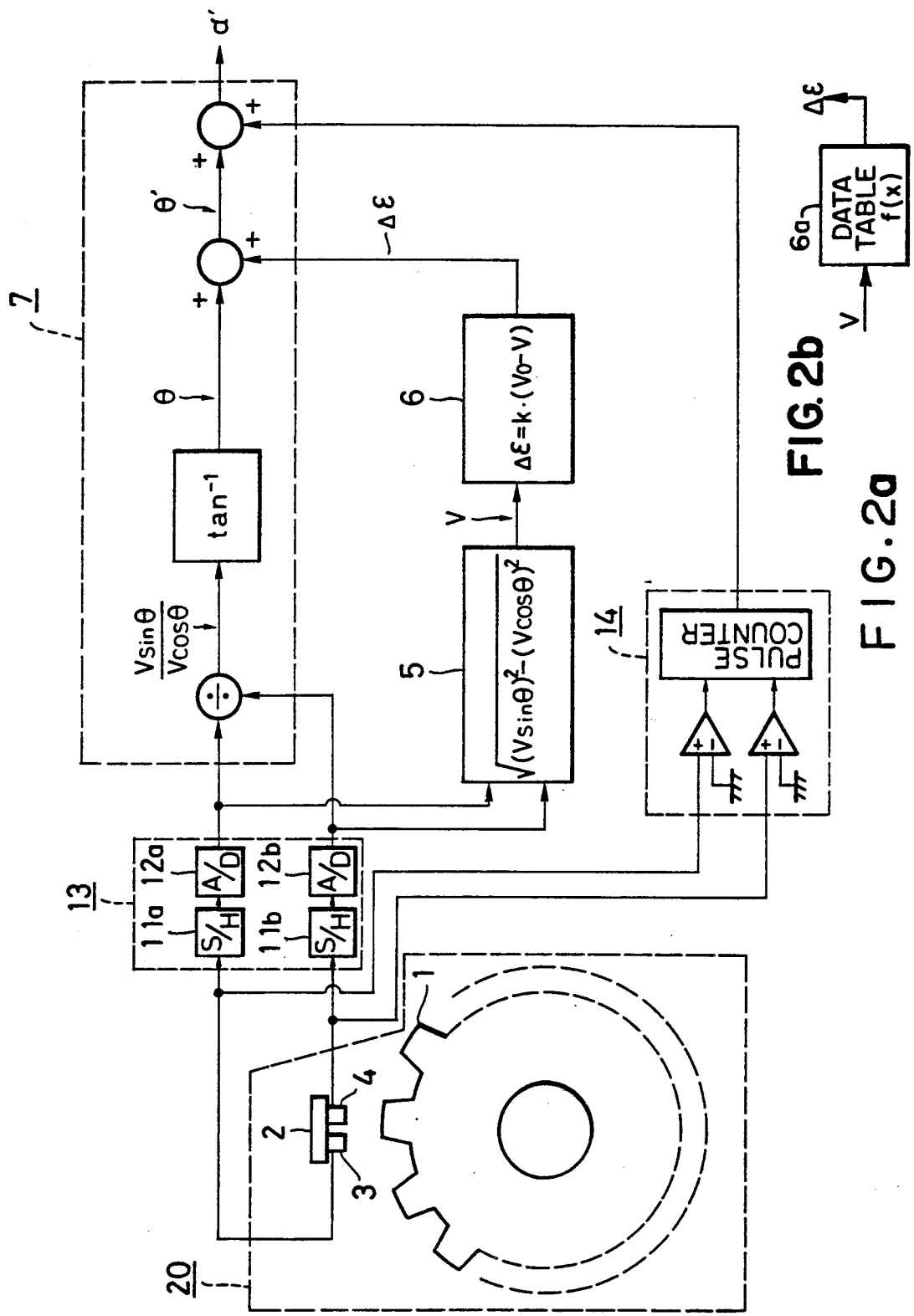
FIGS. 2a and 2b show the structure of a gear type magnetic detecting apparatus for detecting the rotational position which is one embodiment of the present invention apparatus.

FIG. 2a shows the structure of the gear type magnetic rotational position detecting apparatus according to the present invention. The two-phase AC signal generating device 20, the signal generating device 13 and the higher-order signal generating device 14 are identical to those in the prior art apparatus and are therefore excluded from the detailed explanation set forth below.

Referring to FIG. 2a, an amplitude signal generating device 5 has input thereto the two-phase instantaneous signals outputted from the signal generating device 13, executes an operation based on the equation (1) below and generates a signal corresponding to an amplitude V.

$$V = \sqrt{(V\sin\theta)^2 + (V\cos\theta)^2} \tag{1}$$

An eccentricity error signal generating device 6 has input thereto the amplitude signal V from the amplitude signal generating device 5 and generates a signal which corresponds to an eccentricity error $\Delta\epsilon$ in the rotational direction caused by the eccentricity at a position $\theta$ of the rotary moving object. A positional signal generating device 7 adds the eccentricity error signal $\Delta\epsilon$ obtained by the eccentricity error signal generating device 6 to the positional signal $\theta$ (obtained from the operation of $\theta = \tan^{-1}(V \sin \theta / V \cos \theta)$) as shown in equation (2) below to determine the actual position $\theta'$ of the rotary moving object.

$$\theta' = \theta + \Delta\epsilon \qquad (2)$$

Finally, the number from the higher-order signal generating device 14 is added to detect the position $\alpha'$ of the gear within one rotation. It is noted that the amplitude signal generating device 5, the eccentricity error signal generating device 6, the positional signal generating device 7 and the higher-order signal generating device 14 are easily realized by utilizing a microcomputer.

Figure 3:
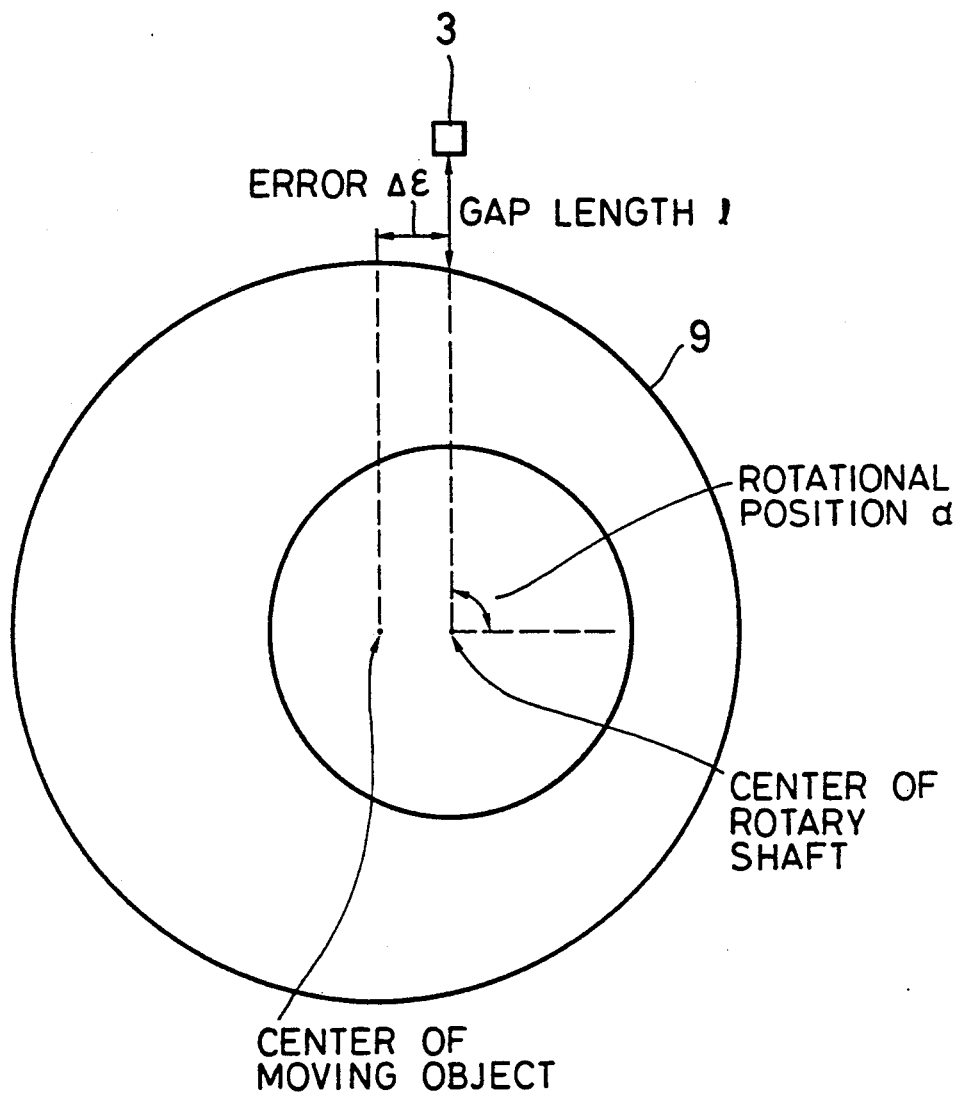
FIG. 3 shows a moving rotary object which is displaced relative its center.
Figure 4:
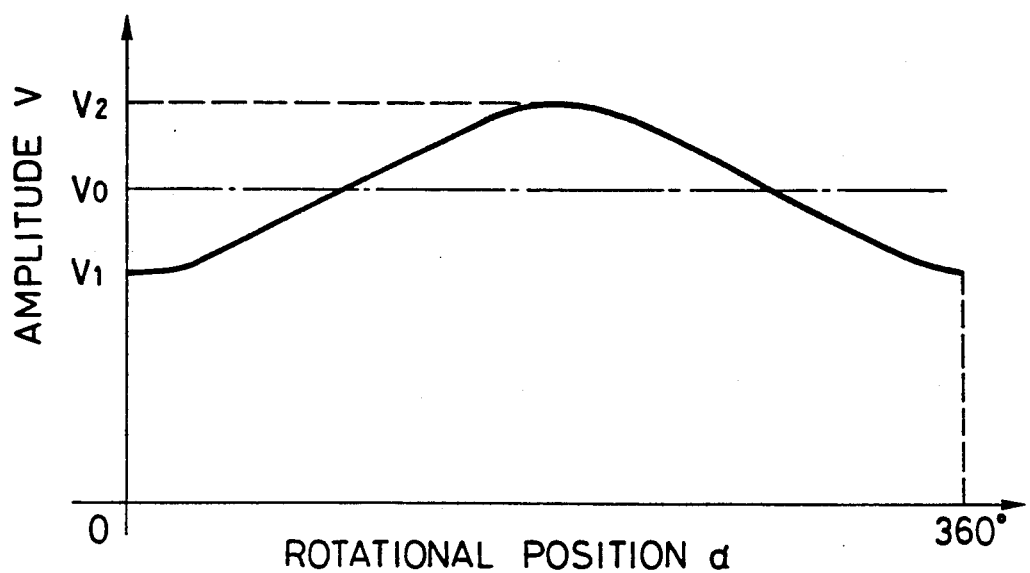
FIG. 4 shows the relation between the rotational position and the signal amplitude.

Details of the eccentricity error signal generating device 6 will now be described. In FIG. 3, the rotary moving object is assumed to be a simple disk and is shown as being eccentrically mounted on the rotary shaft. Since the magnetic sensors 3 and 4 are generally fixed at a given distance from the center of rotation, the distance (the distance referred to as gap length hereinafter) between the magnetic sensors 3, 4 and the outer periphery of the rotary moving object varies depending on the rotational position. This in turn means that the flux density passing through the magnetic sensors 3, 4 will vary depending on the rotational position. Thus, given a gear as the rotary moving object, the amplitude of the sine wave outputted from the magnetic sensors 3, 4 will fluctuate depending on the rotational position, as shown in FIG. 4. As is evident from FIG. 3, the amplitude signal in FIG. 4 reaches a maximum when the gap length is the shortest. Conversely, when the gap length is the largest, the amplitude signal becomes the smallest. Consequently, the direction of eccentricity of the gear can be determined if the rotational positions at the maximum amplitude signal $V_2$ and the minimum amplitude signal $V_1$ are detected. In correspondence to the difference between the maximum value $V_2$ and the minimum value $V_1$ of the amplitude signal, $\Delta V = V_2 - V_1$, the maximum value $\Delta\epsilon_{max}$ of the eccentricity error signal is given by the equation (3) shown below, where $k_1$ is given as a constant.

$$\Delta\epsilon_{max} = k_1 \cdot \Delta V \qquad (3)$$

Therefore, given the central value, $V_0 = ((V_1 + V_2)/2)$ of the amplitude signal fluctuations as shown in FIG. 4 and given $k_2$ as a constant, then the eccentricity error $\Delta\epsilon$ can be calcutated from an approximation equation (4) in accordance with the amplitude signal V at an optional rotational position.

$$\Delta\epsilon \approx \Delta\epsilon_{max} - k_2 |V_0 - V| \qquad (4)$$

The eccentricity error signal generating device 6 generates signals based on the eccentricity error calculated according to the above equation (4).

Figure 5:
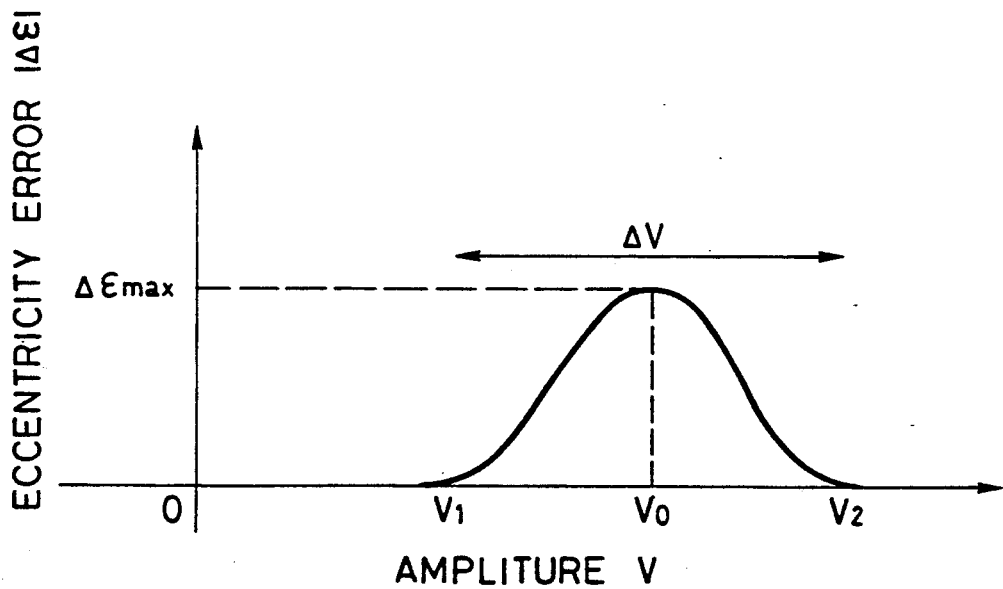
FIG. 5 shows the relation between the amplitude and the eccentricity error.

Because the relation between the absolute value $|\Delta\epsilon|$ of the actual eccentricity error $\Delta\epsilon$ and the amplitude is as shown in FIG. 5, it is also possible as shown in FIG. 2b, instead of approximating according to the equation (4), to generate an eccentricity error signal $\Delta\epsilon$ by storing in advance in a memory 6a a data table f(x) which corresponds to the relation between the eccentricity error and the amplitude shown in FIG. 5 and then executing the operation of the equation (5) corresponding to the amplitude signal.

$$\Delta\epsilon = \Delta\epsilon_{max} \cdot f((V_0 - V)/\Delta V) \qquad (5)$$

The eccentricity error can also be calculated based on approximation of the equations (6) and (7), given $k_3$ and $k_4$ as constants.

$$\Delta\epsilon \approx k_3 (V_2 - V)(V - V_1) \qquad (6)$$

$$\Delta\epsilon \approx k_4 (V_2 - V)^2 (V - V_1)^2 \qquad (7)$$

It should be noted that, although the foregoing description relates to a gear type magnetic detecting apparatus for detecting the rotational position, the present invention is in no way limited to the embodiment. The present invention is applicable to any type detecting apparatus of the position such as drum type magnetic detecting apparatus and optical detecting apparatus so far as they generate two-phase AC signals for detecting the position.

As has been mentioned, the detecting apparatus for the rotational position according to the present invention enables precise and accurate detection of the rotational position by taking into account the errors due to eccentricity.

It should be understood that many modifications and adaptaions of the invention will become apparent to those skilled in the art and it is intended to encompass such obvious modifications and changes in the scope of the claims appended hereto.

What is claimed is:

1. An apparatus for detecting a rotational position of a rotating object, said apparatus comprising:
   a gear having teeth and mounted on the rotating object, said gear being of a magnetic permeable material;
   a first sensor located adjacent said gear for generating a first sine-wave signal $E_1$ in response to said teeth of said gear;
   a second sensor located adjacent said gear for generating a second sine-wave signal $E_2$ having a phase difference of 90° with respect to said sine-wave signal $E_1$, said second signal being generated in response to said teeth of said gear;
   a pair of comparators for outputting two-phase pulse signals by respectively comparing said first sine-wave signal $E_1$ and said second sine-wave signal $E_2$ with a threshold;
   an up-down pulse counter for counting a number of said two-phase pulse signals output from said pair of comparators and for detecting a higher digit portion N of a positional information;
   a pair of sample-and-hold circuits for respectively detecting and outputting instantaneous values of said first sine-wave signal $E_1$ and said second sine-wave signal $E_2$;
   a pair of analog/digital converters for respectively converting said detected instantaneous values output by said pair of sample-and-hold circuits into digital values $S_1$ and $S_2$; and
   a digital computing circuit for calculating the rotational position of the rotating object using said digital values $S_1$ and $S_2$ and said higher digit portion N, wherein said digital computing circuit includes means for performing the following steps:
(i) calculating a position $\theta$ at a lower digit portion of the positional information using one of equations: $\theta = \tan^{-1}(S_1/S_2)$ and $\theta = \tan^{-1}(S_2/S_1)$;
(ii) calculating an amplitude V of the first sine-wave signal $E_1$ and the second sine-wave signal $E_2$ using an equation $V = \sqrt{S_1^2 + S_2^2}$;
(iii) calculating an eccentricity error $\Delta\epsilon$ caused by an eccentricity of the gear at the higher digit portion N from the amplitude V;
(iv) detecting the rotational position of the rotating object using the higher digit portion N, the lower digit portion $\theta$ and the eccentricity error $\Delta\epsilon$.

2. An apparatus as recited in claim 1, wherein said digital computing circuit calculates the eccentricity error $\Delta\epsilon$ using an equation:

$$\Delta\epsilon \approx K1 \cdot \Delta V - k2|V_0 - V|$$

where:

$\Delta V = V_2 - V_1$
$V_2$; a maximum value of the amplitude
$V_1$; a minimum value of the amplitude
k1, k2; constants
$V_0 = (V_1 + V_2)/2$.

3. An apparatus as recited in claim 1, wherein said digital computing circuit calculates the eccentricity error $\Delta\epsilon$ using an equation:

$$\Delta\epsilon = k1 \cdot \Delta V - f\{(V_0 - V)/\Delta V\}$$

where:
k1; a constant
$\Delta V = V_2 - V_1$
$V_2$; a maximum value of the amplitude
$V_1$; a minimum value of the amplitude
$V_0 = (V_1 + V_2)/2$
f{}; a function.

4. An apparatus as claimed in claim 3, wherein said function $f\{(V_0 - V)/\Delta V\}$ is stored in advance in a memory.

* * * * *